Nov. 27, 1928. 1,693,213
C. W. WEISS
TRANSMISSION
Filed Aug. 1, 1924 2 Sheets-Sheet 1
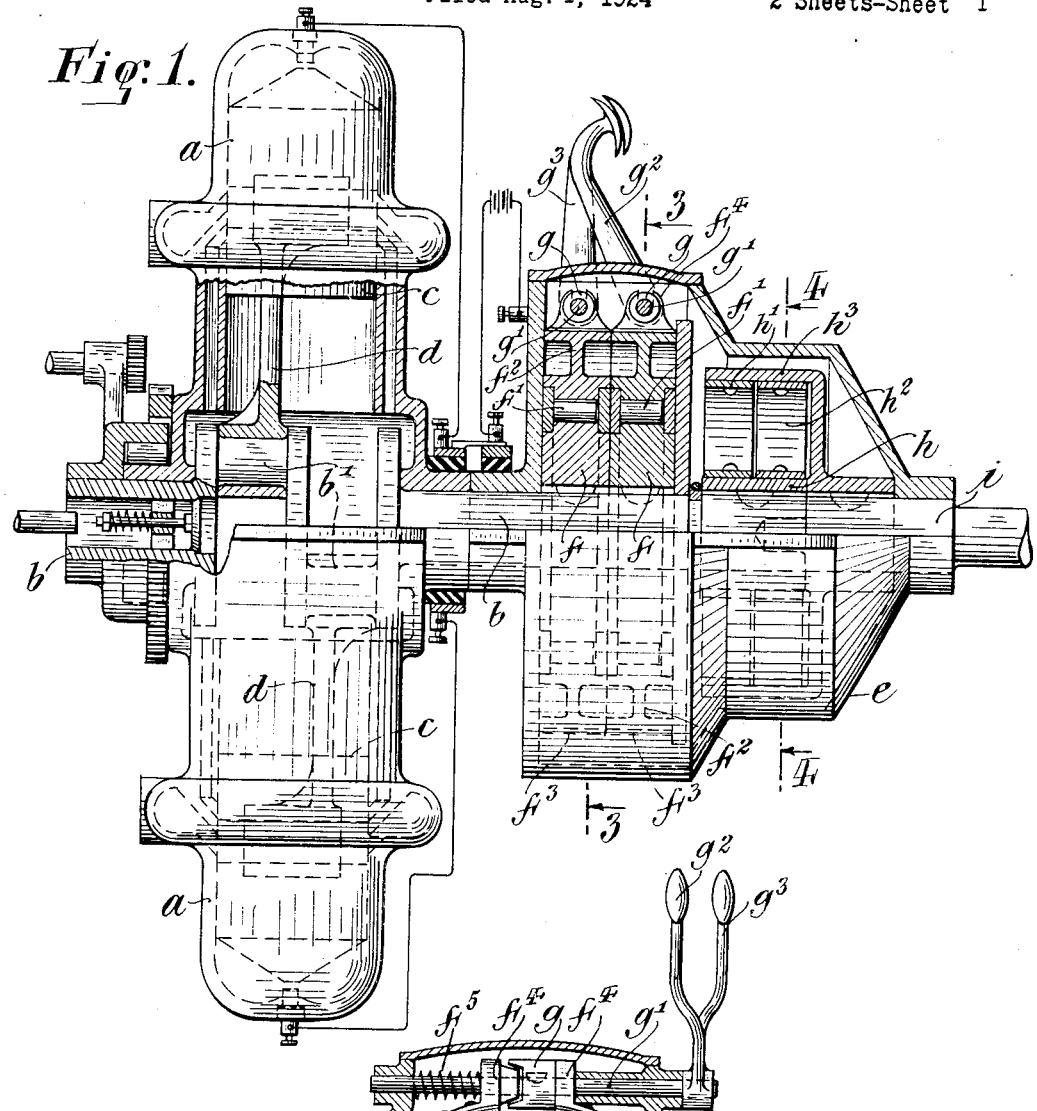
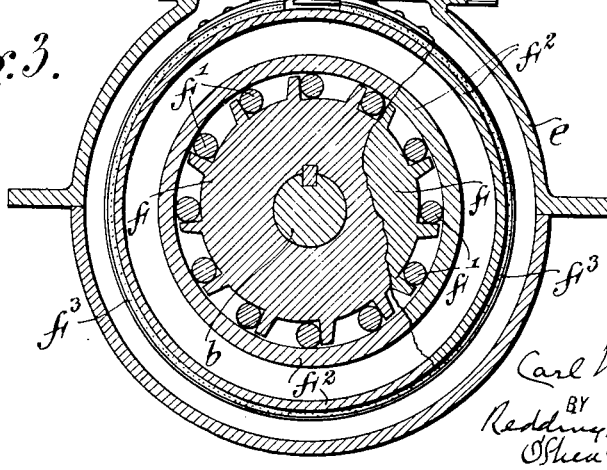
INVENTOR
Carl W. Weiss
BY
Redding, Greeley,
O'Shea & Campbell
ATTORNEYS Nov. 27, 1928.
C. W. WEISS
1,693,213
TRANSMISSION
Filed Aug. 1, 1924
2 Sheets-Sheet 2
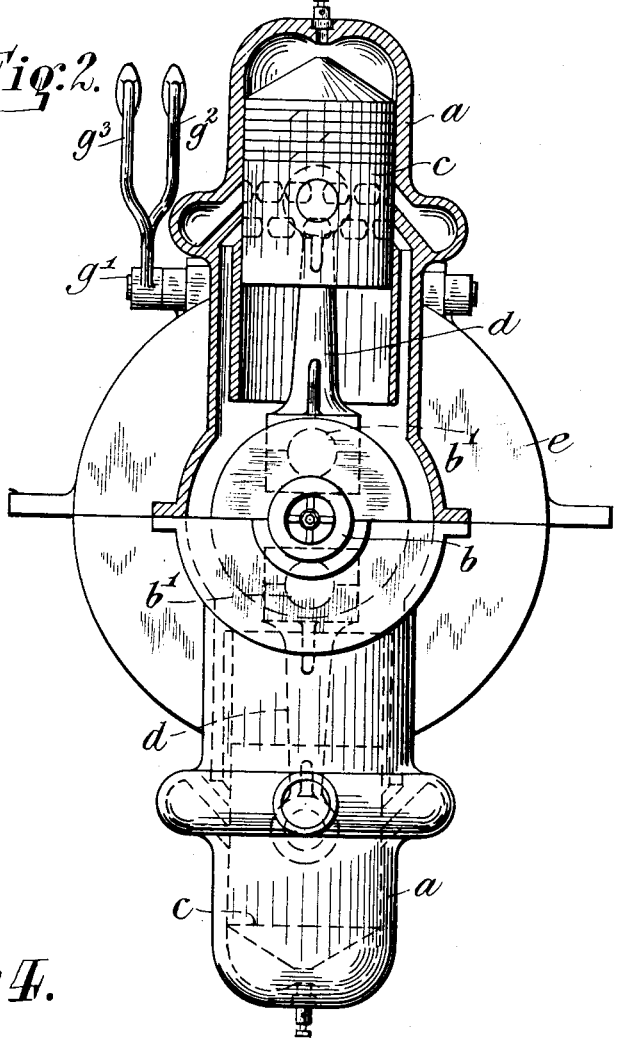
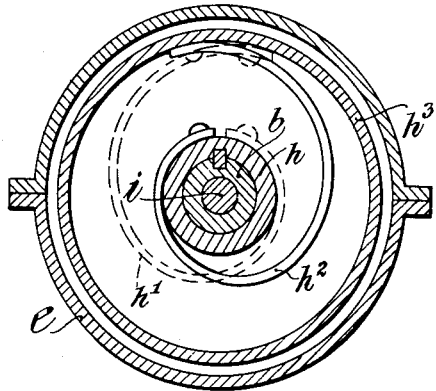
INVENTOR
Carl W. Weiss
BY
Redding, Greeley, O'Shea Campbell
ATTORNEYS Patented Nov. 27, 1928.

1,693,213

UNITED STATES PATENT OFFICE.

CARL W. WEISS, OF BROOKLYN, NEW YORK.

TRANSMISSION.

Application filed August 1, 1924. Serial No. 729,477.

In the mechanism which forms the subject of this invention, a prime mover is so combined with other parts of the transmission devices that the prime mover itself becomes an element of the transmission mechanism by reason of its torque reaction. To this end the prime mover and the driven member or shaft are mounted for independent rotation on a common axis, the prime mover being capable of rotation in one direction only while the driven member is capable of rotation either in the same or in the opposite direction. The speed of the prime mover can be controlled as usual and the speed of the driven member can be varied relatively to the speed of the prime mover. Either element can remain stationary while the other rotates. A duplex reaction device is applied to the driven member so that it can be held from rotation in either direction and permitted to rotate in the opposite direction. The invention will be more fully explained hereinafter with reference to the accompanying drawings in which it is illustrated and in which—

Figure 1 is a view partly in longitudinal section and partly in elevation of one form of transmission which embodies the invention.

Figure 2 is a view partly in end elevation and partly in transverse section through one cylinder of the prime mover shown in Figure 1.

Figure 3 is a view in section on the plane indicated by the broken line 3—3 of Figure 1, illustrating particularly the form of reaction device shown in Figure 1.

Figure 4 is a detail view in section on the plane indicated by the line 4—4 of Figure 1 illustrating particularly a suitable form of device provided for securing uniform and constant rotation of the driven part.

In the embodiment of the invention chosen for illustration in the drawings, the prime mover is a rotary engine of the reciprocating piston type in which the cylinders are mounted to revolve about the axis of the crank shaft which, in this instance, is itself rotatable on its own axis. Prime movers of this general character are well known and require no extended description herein. As shown, the prime mover comprises two opposed cylinders $a$, $a$, combined in a structure which is mounted for rotation about the crank shaft $b$. Means are preferably provided, as indicated generally at $e$, for preventing rotation of the prime mover in one direction. Each piston $c$ is connected directly by its pivoted piston rod $d$ with the corresponding crank pin $b'$ of the crank shaft $b$. The latter is suitably supported for rotation and, in the construction shown, the driven part, which may be a shaft $i$, independent of the crank shaft $b$, is suitably supported in axial alignment with the crank shaft $b$.

Within the housing $e$ there is mounted for cooperation with the crank shaft $b$, a reaction device which may prevent rotation of the crank shaft in one direction while permitting rotation in the opposite direction. In order to permit at will a reversal of the direction of rotation of the driven member, the reaction device is duplex, the two parts being identical in construction except for the arrangement of the engaging members in opposite relation. As shown, each reaction device comprises a roller clutch member $f$ which is secured on the shaft $b$, balls or rollers $f'$, and a co-acting member $f^2$, these parts being arranged for operation as usual. For each co-acting clutch member $f^2$ there is provided a brake band $f^3$ by which the co-acting member $f^2$ may be held from rotation at will or released. As shown, the ends of the brake band $f^3$ are provided with jaws $f^4$ which are pressed normally together by a spring $f^5$. Between the jaws is a cam $g$ mounted on a shaft $g'$ which is provided with an operating lever $g^2$ or $g^3$ as the case may be. By tightening one band and releasing the other, the shaft is prevented from rotating in one direction and is permitted to rotate in the other direction, and vice versa.

In order that the driven part $i$ may be driven with uniform and constant velocity notwithstanding that the member $b$ may be driven with a succession of impulses, the driven part $b$ is independent of the crank shaft $i$ and is operatively connected there-with by a resilient coupling which, in the embodiment of the invention illustrated, comprises a sleeve $h$ fixed to the crank shaft $b$, two springs $h'$ and $h^2$ disposed in opposite relation and having one end of each secured to the sleeve $h$ and the other end secured to a hub or sleeve $h^3$ which is keyed to the shaft $i$.

In the operation of this transmission it is obvious that the cylinders may revolve about the axis of the crank shaft when the crank shaft is held against rotation and that the shaft may rotate when the cylinders are held against revolution. If the mechanism is applied to the propeller shaft of an automobile, for example, and the reaction device or control clutches are so manipulated as to prevent reverse or counter-clockwise rotation of the crank shaft, but to permit clockwise rotation thereof and the resistance to the forward movement of the automobile is sufficient at the moment to prevent clockwise rotation of the propeller shaft $i$ and therefore of the crank shaft $b$, the cylinders will revolve about the axis of the crank shaft in a clockwise direction when the engine is started. Power impulses delivered by the pistons through the connecting rods to the crank shaft react on the cylinders in a clockwise direction and as the speed of the prime mover increases the centrifugal force of the combined weight of the pistons and the connecting rods tends to rotate the crank shaft in a clockwise direction, which is the only direction in which the control clutch permits the crank shaft to rotate when the resistance is overcome. As the car moves forward at the desired speed, the cylinders revolving at normal constant speed, the relative speed of the crank shaft and the cylinders, that is, the cyclic speed for time unit, is the real speed difference; that is to say, the cylinder speed, say 1,000 cycles, minus the crank shaft speed of say 900 cycles, gives 100 impulses for each cylinder in a two-cycle engine. As the speed of the crank shaft increases and approaches the cylinder speed, the impulses become less frequent and the torque lower. Finally, when the cylinders and the crank shaft rotate at the same speed there are no impulses, there is no torque, and no charge is taken into the cylinders. This condition establishes perfect coasting, with the mechanism acting as an engine out of operation. To slow down, the engine speed is reduced to a minimum, by closing the throttle, and the brake band of the forward clutch is tightened. The propeller shaft is thus brought to a stop. By keeping the forward clutch locked and at the same time releasing the reversing clutch, the crank shaft may be made to rotate in a counter-clockwise direction, for reversing, although the cylinders continue to revolve in a clockwise direction as before.

In a transmission, such as that described, in which the driving member (in this instance an engine with radial cylinders and reciprocating pistons) and the driven member (the crank shaft) are rotatable independently of each other and are connected only through the radially movable pistons of the engine, each radially movable piston and its connecting rod constitute a centrifugal body or unbalanced mass which is subject to centrifugal action and act upon the driven member with a succession of impulses which tend alternately to rotate the driven member in opposite directions under the control of the reaction device or contral clutch. It will be seen, therefore, that power impulses delivered by the pistons, acting as centrifugal bodies in the rotation of the engine, through the connecting rods to the crank shaft, react on the cylinders in clockwise direction, and that as the speed of rotation of the engine increases, the centrifugal action of the combined mass of each piston and its connecting rod rotates the crank shaft in the clockwise direction, that being the only direction of rotation in which a shaft is permitted by the reaction device or control clutch to rotate when the resistance to the forward movement of the car is overcome. The rate at which the car moves forward will then depend upon the resistance and the centrifugal force developed by the engine, such centrifugal force being dependent upon the mass of the centrifugal bodies and the speed of rotation of the engine, so that the rate of movement of the car is dependent ultimately upon the speed of rotation of the engine and is governed by the throttle.

I claim as my invention:

1. A transmission comprising a rotatable prime mover, having a reciprocating piston, a rotatable crank shaft, a connection between the piston of the prime mover and the crank pin of the crank shaft, and means independent of the rotation of the prime mover to prevent rotation of the crank shaft in a direction opposite to that of the prime mover and to permit rotation thereof in the same direction as that of the prime mover, whereby the torque action of the driven member is determined by the centrifugal action of the piston.

2. A transmission comprising a rotatable prime mover having a reciprocating piston, a rotatable crank shaft, a connection between the piston of the prime mover and the crank pin of the crank shaft, and means independent of the rotation of the prime mover under the control of the operator to prevent rotation of the crank shaft in a direction opposite to that of the prime mover, and to permit rotation thereof in the same direction as that of the prime mover, whereby the torque action of the driven member is determined by the centrifugal action of the piston.

3. A transmission comprising a rotatable prime mover having a reciprocating piston, a rotatable crank shaft, a connection between the piston of the prime mover and the crank pin of the crank shaft, and oppositely arranged brakes independent of the rotation of the prime mover under the control of the operator to prevent rotation of the crank shaft in a direction opposite to that of the prime mover and to permit rotation thereof in the same direction as that of the prime mover, whereby the torque action of the driven member is determined by the centrifugal action of the piston.

This specification signed this 22nd day of July, A. D. 1924.

CARL W. WEISS.